(12) United States Patent
Pitkanen

(10) Patent No.: US 8,611,481 B2
(45) Date of Patent: Dec. 17, 2013

(54) BLIND CONTROL CHANNEL DETECTION

(75) Inventor: Sampo Ilari Pitkanen, Salo (FI)

(73) Assignee: Broadcom Corporation, Irvine, CA (US)

( * ) Notice: Subject to any disclaimer, the term of this patent is extended or adjusted under 35 U.S.C. 154(b) by 215 days.

(21) Appl. No.: 13/035,188

(22) Filed: Feb. 25, 2011

(65) Prior Publication Data

US 2012/0219095 A1 Aug. 30, 2012

(51) Int. Cl.
H04L 1/02 (2006.01)
H04L 1/00 (2006.01)
H04L 27/06 (2006.01)
H04B 7/00 (2006.01)
H04W 4/02 (2009.01)

(52) U.S. Cl.
USPC ........... 375/347; 375/316; 375/340; 375/346; 370/335; 370/329; 370/328; 370/310; 370/342; 455/515; 455/507; 455/500; 455/39

(58) Field of Classification Search
USPC .......... 375/347, 346, 316, 340; 370/335, 329, 370/328, 310, 342; 455/515, 507, 500, 391
See application file for complete search history.

(56) References Cited

U.S. PATENT DOCUMENTS

| | | | | |
|---|---|---|---|---|
| 6,501,788 | B1 * | 12/2002 | Wang et al. | 375/148 |
| 8,102,957 | B2 * | 1/2012 | Paul et al. | 375/347 |
| 2002/0131479 | A1 * | 9/2002 | Butler et al. | 375/147 |
| 2005/0180364 | A1 * | 8/2005 | Nagarajan et al. | 370/335 |
| 2010/0177743 | A1 * | 7/2010 | Haim et al. | 370/335 |
| 2011/0002283 | A1 * | 1/2011 | Drugge et al. | 370/329 |
| 2011/0158180 | A1 * | 6/2011 | Melis et al. | 370/328 |

* cited by examiner

Primary Examiner — Chieh M Fan
Assistant Examiner — Michelle M Koeth
(74) Attorney, Agent, or Firm — Stanton IP Law

(57) ABSTRACT

The present invention proposes a method, including receiving a sequence of channelization encoded correlated symbols $x_i$, analyzing statistical or orthogonality properties of the sequence, and deciding on presence or absence of a specific control channel based on the analyzed properties. The present invention also proposes a correspondingly configured device and computer program product. By virtue thereof, "blind" detection of the specific control channel such as S-CPICH is possible.

23 Claims, 6 Drawing Sheets

BLIND CONTROL CHANNEL DETECTION

TECHNICAL FIELD

The present invention relates to methods, apparatuses and computer program products for blindly detecting control channels.

BACKGROUND

Mobile data transmission and data services are constantly making progress. With the increasing penetration of such services, also the transmitted data volume is continuously increasing. Given the constraints of limited bandwidth for transmission, data throughput is an important aspect for users as well as network operators.

In high speed downlink packet access, HSDPA, MIMO (Multiple Input Multiple Output) is a new feature that is becoming more common in practical networks. It relies on plural, e.g. two transmit and reception antennas to be able to transmit more data over the same bandwidth. One problem with MIMO is that older terminals that do not use MIMO have no knowledge of the second transmit antenna, and therefore the usage of MIMO in the network causes extra interference. This problem also affects terminals that support MIMO, but for some reason are not in MIMO mode (e.g. MIMO mode is disabled or switched off for reasons of power saving or network configuration). The problem may also occur in connection with terminals that only have one reception antenna and therefore do not support MIMO (but are new enough so that MIMO can be taken into account in their design).

Such problem has been recognized by operators and network vendors, and measures have been taken to minimize the effect on non-MIMO terminals. These measures include for example turning the second transmit antenna off when there are no MIMO terminals in the network, and scheduling transmissions so that large amounts of data are not sent from the second antenna when non-MIMO terminals are receiving data. In such cases, data is sent only via the first antenna, thereby reducing data throughput.

However, an unsolvable problem resides in the MIMO pilot channel as a particular example of a control channel. A HSDPA network that supports MIMO transmits two pilot channels: a primary common pilot channel, P-CPICH, on the primary antenna for all users, and a secondary common pilot channel, S-CPICH, on the second antenna for MIMO users only. The S-CPICH channel contains only a known pilot pattern and it is used for channel estimation in the receiver. Since the pilot channel contains a known pattern of bits, if the channelization code used for conveying/encoding the pilot channel is known, the S-CPICH can be cancelled and the effect on non-MIMO terminals can be nullified. Unfortunately, non-MIMO terminals have no knowledge of the channelization code or even if the channel is used at all.

Since MIMO is just being taken into use the problem has not existed before and there are no solutions to such particular problem. Pilot channels (control channels) have been cancelled before, but in all those cases, all relevant information about those channels has been known (i.e. was signaled from the network to the receiver).

Also, previous efforts in standardization in connection with MIMO and HSDPA had in focus that information on the control channel, such as S-CPICH information, should be transmitted to non-MIMO terminals. However, this does not seem to represent an optimum solution in view of at least an increased signaling.

Thus, there is still a need to further improve such systems such as MIMO systems.

SUMMARY

Various aspects of examples of the invention are set out in the claims.

According to a first aspect of the present invention, there is provided a method comprising receiving a sequence of channelization encoded correlated symbols, analyzing properties of the sequence, and deciding on presence or absence of a specific control channel based on the analyzed properties.

According to exemplary further developments thereof
the receiving comprises receiving channelization encoded sequences for all channelization codes, eliminating sequences encoded with known channelization codes, and subjecting those sequences of symbols encoded with unknown channelization codes to the analyzing;
the method further comprises performing a cancellation procedure for symbols of the control channel decided to be present;
the properties reside in a statistical or orthogonality property of the sequences;
the method further comprises terminating a cancellation procedure for symbols of the control channel decided to be absent;
the analyzing comprises, per cycle, first summing up a number N of the symbols to obtain a first sum, multiplying each of the number N of symbols with a respective multiplier to obtain a number N of respective products, second summing up the number N of products to obtain a second sum, buffering, with each cycle, the power of the first sum and a divisor based on the second sum, respectively, and dividing the buffered power of the first sum by the buffered divisor to obtain a ratio, and wherein the deciding comprises comparing the ratio with at least one threshold value, wherein, if the ratio is larger than the a first threshold value, the specific control channel is decided to be present, while, if the ratio is smaller than a second threshold value, the specific control channel is decided to be absent;
the analyzing is performed for one or more cycles;
one cycle corresponds to a transmit time interval of the sequence, and the number N of symbols is not more than the number of symbols per transmit time interval;
the respective multiplier is the respective symbol itself, the divisor is the second sum;
the number N of symbols is an even number, the respective multiplier is the complex conjugate of an STTD pattern, and the divisor is the power of the second sum;
the first threshold value is greater than or equal to the second threshold value.

According to a second aspect of the present invention, there is provided a device comprising a receiver module configured to receive a sequence of channelization encoded correlated symbols, an analyzing module configured to analyze properties of the sequence, and a decision module configured to decide on presence or absence of a specific control channel based on the analyzed properties.

According to exemplary further developments thereof
the receiver module is configured to receive channelization encoded sequences for all channelization codes, to eliminate sequences encoded with known channelization codes, and to input those sequences of symbols encoded with unknown channelization codes to the analyzing module;

the device further comprises a processing module configured to perform a cancellation procedure for symbols of the control channel, responsive an output of the decision module indicating presence of the control channel;

the properties reside in a statistical or orthogonality property of the sequences the decision module is further configured to issue a request to terminate a cancellation procedure for symbols of the control channel responsive to decision module indicating absence of the control channel;

the analyzing module comprises a first summer unit configured to sum up a number N of the symbols to obtain a first sum, a multiplier unit configured to multiply each of the number N of symbols with a respective multiplier to obtain a number N of respective products, a second summer unit configured to sum up the number N of products to obtain a second sum, buffer units configured to buffer, with each cycle, the power of the first sum and a divisor based on the second sum, respectively, and a division unit configured to divide the buffered power of the first sum by the buffered divisor to obtain a ratio, and wherein the decision module comprises a comparator unit configured to compare the ratio with at least one threshold value, and configured to output a signal indicating presence of the control channel if the ratio is larger than the a first threshold value, and configured to output a signal indicating absence of the control channel if the ratio is smaller than a second threshold value.

the analyzing module is configured to perform an analysis for one or more cycles;

one cycle corresponds to a transmit time interval of the sequence, and the number N of symbols is not more than the number of symbols per transmit time interval;

the respective multiplier is the respective symbol itself, and the divisor is the second sum;

the number N of symbols is an even number, the respective multiplier is the complex conjugate of an STTD pattern, and the divisor is the power of the second sum;

the first threshold value is greater than or equal to the second threshold value.

According to a third aspect of the present invention, there is provided a computer program product comprising computer-executable components which, when the program is run on a computer, are configured to receive a sequence of channelization encoded correlated symbols, analyze properties of the sequence, and decide on presence or absence of a specific control channel based on the analyzed properties.

The above computer program product may further comprise computer-executable components which, when the program is run on a computer, perform the method aspects mentioned above in connection with the first aspect.

The above computer program product/products may be embodied as a computer-readable storage medium.

The methods, devices and computer program products described in this document use, at least in exemplary embodiments, the special statistical or orthogonality properties of the control channel such as a S-CPICH channel, to thereby enable to blindly detect it so that it can be cancelled. Reception of non-MIMO terminals is thus improved. Thus, performance improvement is based on methods, devices and computer program products enabling blind detection of the pilot channel so that it can be cancelled. In at least another exemplary embodiment, blind detection of the control channel such as the pilot channel does not only encompass detection of its presence but additionally or alternatively detection of its absence. Hence, in case of detection of its absence, in at least one exemplary embodiment, cancellation processing for the control channel such as a S-CPICH can be terminated and reception of non-MIMO terminals is thus improved.

The control channel, i.e. secondary common pilot channel S-CPICH as an example, has special statistical and/or orthogonality properties that are unique to HSDPA control and/or pilot channels. This invention in at least exemplary embodiments reveals and/or exploits those statistical and/or orthogonality properties. To reveal the properties, according to one or more embodiments, the method is applied to all unknown HSDPA channels and sees if they fulfill those properties. If a channel is found, it can then be cancelled.

The principles taught in connection with at least some of the embodiments are described with reference to the S-CPICH as a particular example of a control channel in HSDPA MIMO. Nonetheless, those principles can be applied also to other control channels of systems differing from HSDPA and/or MIMO, as long as those control channels exhibit the same statistical and/or orthogonality properties. Also, the control channels can be control channels differing from pilot channels representing a subset of control channels.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1A:
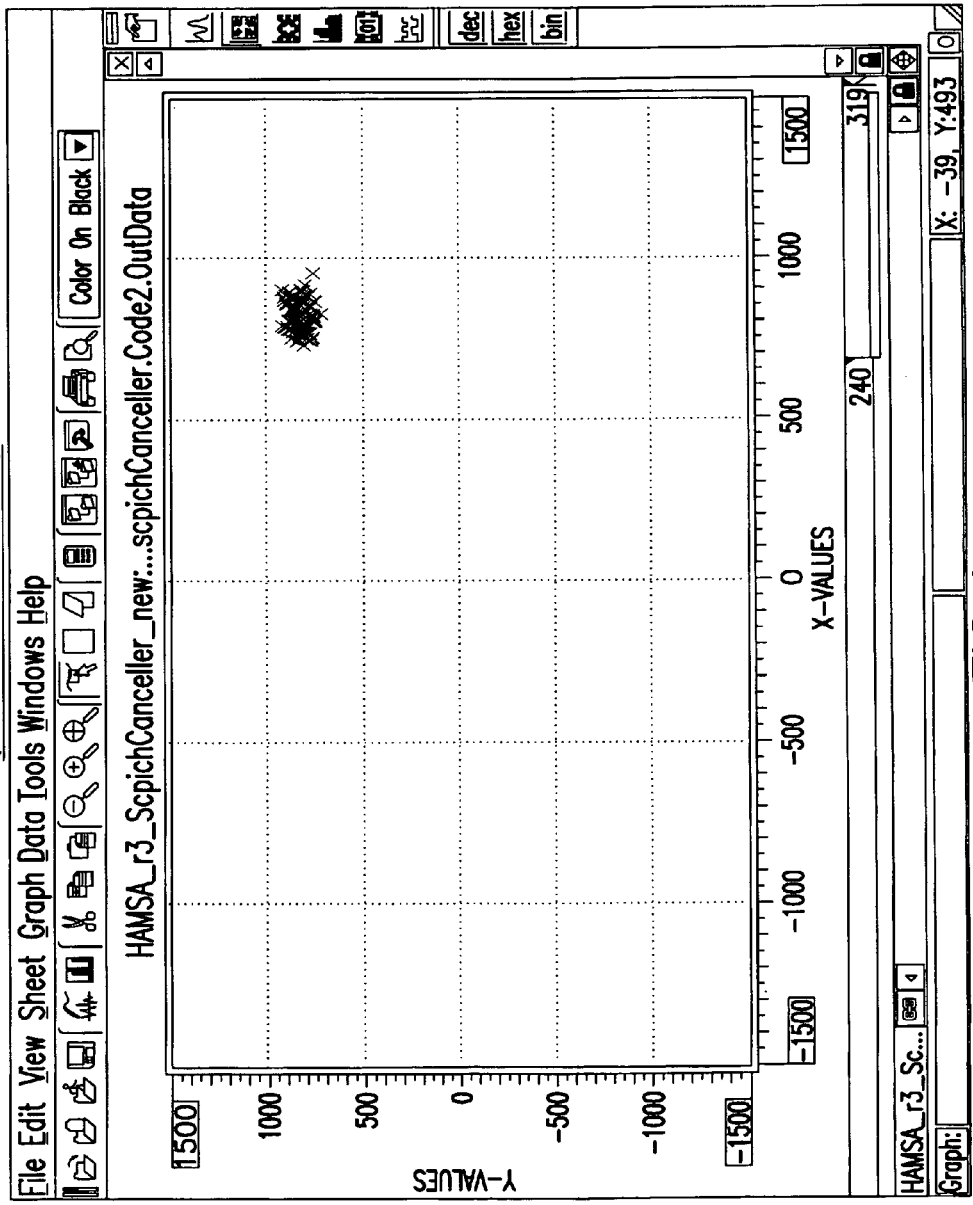
FIG. 1 illustrates in a complex plane representation in part (a) asymmetric properties of a S-CPICH as an example of a control channel and—for comparative purposes—in part (b) symmetric properties of other channels and/or constellations, in QPSK representation, respectively.

Exemplary aspects of the invention will be described herein below.

Generally, the invention is implemented in a modem part of HSDPA reception. Reception can take place in a terminal station or user equipment UE, but also in a base station or Node_B. MIMO can be applied for transmission from the network side towards the terminal or UE side, but also applied for transmission from a terminal UE towards the network, if the terminal has multiple transmit and receive antennas.

Also, the method, devices and computer program products presented herein are generally applicable to identify any control channel having the same or similar statistical or orthogonality properties. Though, in the following, the S-CPICH is used as an exemplary example. Nevertheless, in case the channelization code for S-CPICH is known while the code for P-CPICH is unknown, the teachings presented herein could also be used to blindly detect the P-CPICH. Likewise, HSDPA is only used as an example for a currently investigated system. Other systems can benefit also from the principles presented herein as long as they have a control channel having identical or similar properties like the S-CPICH The detection contains roughly the following steps:
In one aspect, select all unknown channelization codes
Receive symbols from all those codes
Apply detection algorithm and/or method to those symbols and see if they contain S-CPICH
If S-CPICH is found, start cancelling it. At the same time, or after starting cancellation, monitor the found code, since it can be turned off, so as to detect whether (if turned off) the symbols do no longer contain the S-CPICH.

The first step uses some prior knowledge to minimize the amount of unknown codes. S-CPICH has a spreading factor of 256, which means it has 256 different codes it can be on. This set can however be reduced significantly if all known codes are removed and/or eliminated from it. Also, in HSDPA, codes 16-255 are generally reserved for data transmission, so they can be regarded with a much lower importance than the first 16 codes.

The S-CPICH consists of a pilot pattern, a continuous flow of ones (1+i in a QPSK constellation, that can be illustrated in a complex plane). The symbols can be received with correlators as any other channel, for example in a Rake receiver. A significant difference to other received channels is that S-CPICH is transmitted from the second transmit antenna, but a non-MIMO terminal is only aware of the first transmit antenna. Therefore, the phase and amplitude of the received S-CPICH symbols can change randomly over time due to fading. If not for this effect, detecting the channel would be a lot easier: the symbols could just be demodulated and checked if the received bits are the pilot pattern. That is however not possible without quite complex calculation of the second antenna phase reference.

The solution provided by exemplary embodiments according to this invention is a lot less complex:

Ideally all unknown channels should be received at the same time, but this might not be possible due to hardware or processing limitations. The unknown channels might have to be received and/or processed sequentially, or processed partially in parallel.

The statistical basis and/or properties exploited and revealed by at least one of the exemplary embodiments is that every other constellation (other than the control channel or pilot channel S-CPICH, for example) used in WCDMA/HSDPA (such as QPSK, 16-QAM, 64-QAM) is symmetric to zero, and therefore the complex sum of the symbols from one of those constellations over a long enough time period goes to zero. On the other hand, the pilot pattern is non-symmetric, consisting of only one symbol (1+i in a QPSK constellation). Therefore the complex sum of the pilot channel symbols does not go to zero. Notably, this feature is independent of and/or at least does not heavily depend on the constellation amplitude or phase, which are both random due to the fact that the S-CPICH is transmitted from another antenna.

There are only two pilot channels in HSDPA chosen as an example scenario: P-CPICH and S-CPICH. Since the receiver is aware of P-CPICH (transmitted to/received from all terminals or receivers), if any unknown channel is found that contains a pilot channel it can be deduced that it is S-CPICH. For clarification, the pilot constellation and a symmetric constellation (QPSK) can be seen in the FIG. 1.

Figure 1B:
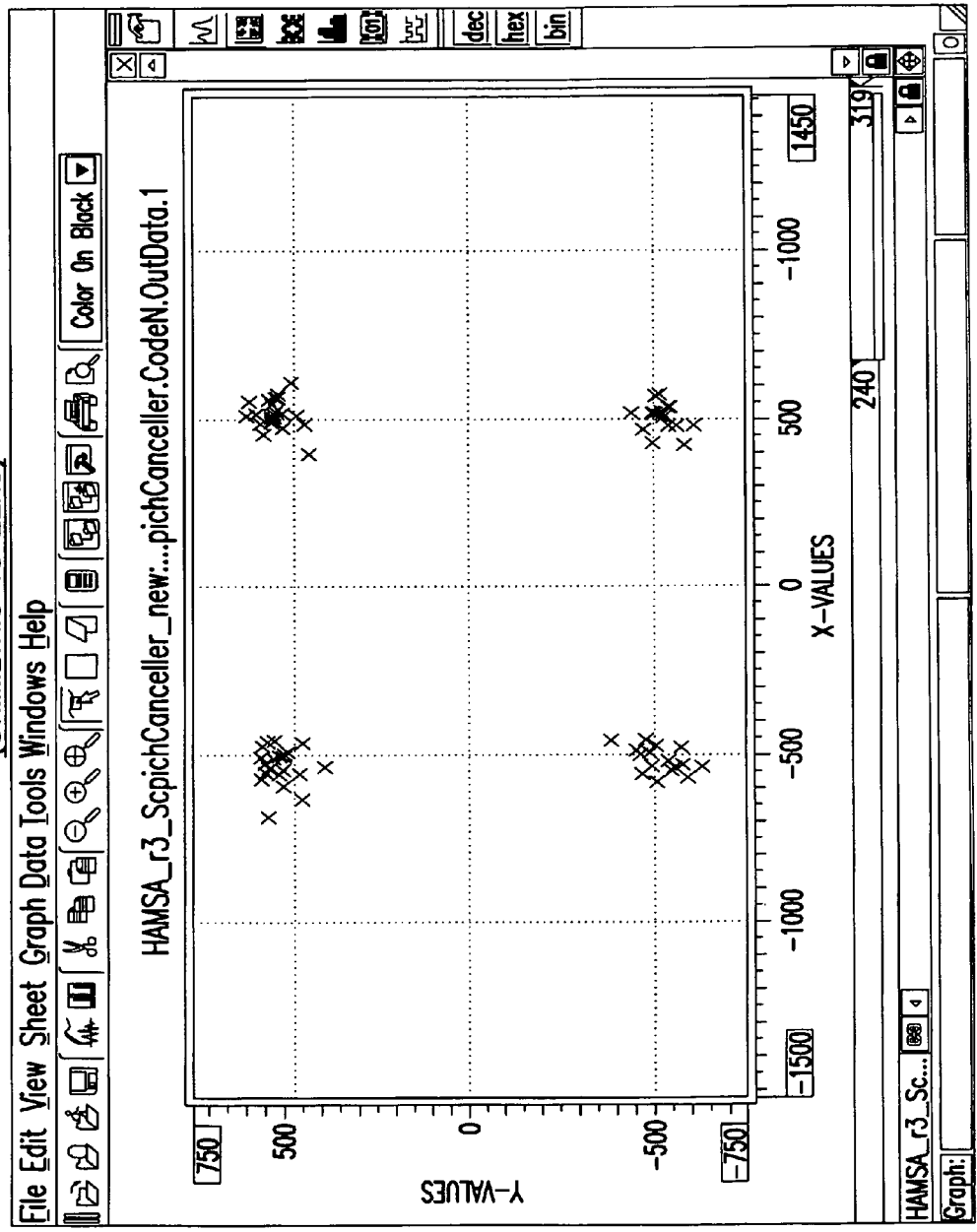

As explained, FIG. 1 illustrates in a complex plane representation in part (a) the asymmetric properties of a S-CPICH as an example of a control channel and—for comparative purposes—in part (b) the symmetric properties of other channels and/or constellations.

In connection with at least an exemplary embodiment, details of which are shown and explained with reference to FIG. 4, the following is noted.

In order to determine whether a sum of symbols (not carried on a pilot channel) is close enough to zero, it is not possible to use an absolute scale due to changing signal levels over time. Therefore the sum is normalized with the power. Regardless of the constellation, the sum of the powers of the symbols goes up over time. Therefore if the ratio "sum/power" is high enough, the processed symbols are pilot symbols. The general functionality of the method, device and computer program product can be seen in the FIG. 4 in more details.

First, the sum of the symbols and sum of the powers are calculated. (Calculation is explained now with reference to a single cycle, if more cycles are considered, a variable "j" denoting the respective cycle will have to be considered in addition)

A first summer unit 221 calculates a first sum as $$Sj = \sum_{i=1}^{N} X_i$$

A second summer 223 unit calculates a second sum as $$Qj = \sum_{i=1}^{N} X_i^2$$

$x_i^2$ is obtained by multiplying the respective symbol with itself in a multiplier unit 222.

N is the number of symbols to sum over. The optimum value can depend on the system. In HSDPA, a good value for N is for example the number of symbols in a transmit time interval TTI, which is N=30. A TTI has a duration of 2 ms.

After the two sums, i.e. the first and second sum, are calculated, the following ratio is then calculated in a processing and division module 224:

$$R_A = \frac{(S_j)^2}{Q_j}$$

(in case of evaluating a single cycle only).

More generally, in case of considering multiple cycles j, the respective ratios $R_{Aj}$ are buffered for subsequent evaluation. The power of the sum is used in the denominator in this exemplary embodiment because Qi is also a power. If $R_A$ is high enough (larger than a threshold value $V_1$) the symbols are most likely a pilot pattern and they can be cancelled.

Some hysteresis should be added, a good solution found in practice was that if about 3-5 decisions are positive in a row then the symbols are regarded as S-CPICH. Therefore, about 3 to 5 cycles (j=1 to 3, or j=1 to 5) are buffered and evaluated.

When S-CPICH cancelling starts, the monitoring of the cancelled channel needs to continue. As stated before, the network can turn the channel off if there are no MIMO users in the same cell. Therefore, cancelling a non-existent channel would actually cause interference. Exactly the same method, device and/or computer program product can be used, this time it is monitored if $R_A$ drops below a certain threshold for long enough. (smaller than a threshold value $V_1$'). $V_1$ should be greater than or equal to $V_1'$. If it is found that S-CPICH is not present, cancellation of the S-CPICH can then be terminated.

In the following, differences of another exemplary embodiment (see also FIG. 5) compared to the above described one will be described.

This other exemplary method, device and/or computer program product is based on the fact that the pilot pattern transmitted by S-CPICH has a property of being orthogonal to the STTD pattern (Space Time Transmit Diversity). The STTD pattern is a pattern of bits that is used in transmitting the primary P-CPICH from the second transmit antenna if open loop transmit diversity is used. The practical effect of the orthogonality is that if the received symbols are multiplied by the complex conjugate of the STTD pilot pattern, the average sum over an even number of symbols should be zero. On the other hand, multiplying with the pattern has no consistent effect on the average sum of any other constellation. Therefore if symbol sums before and after the STTD pattern are compared, the sum before should be considerably larger if the code contains S-CPICH. This property is independent of phase and amplitude of the symbols, which means it can be used even if the channel is transmitted from a different transmit antenna.

Figure 5:
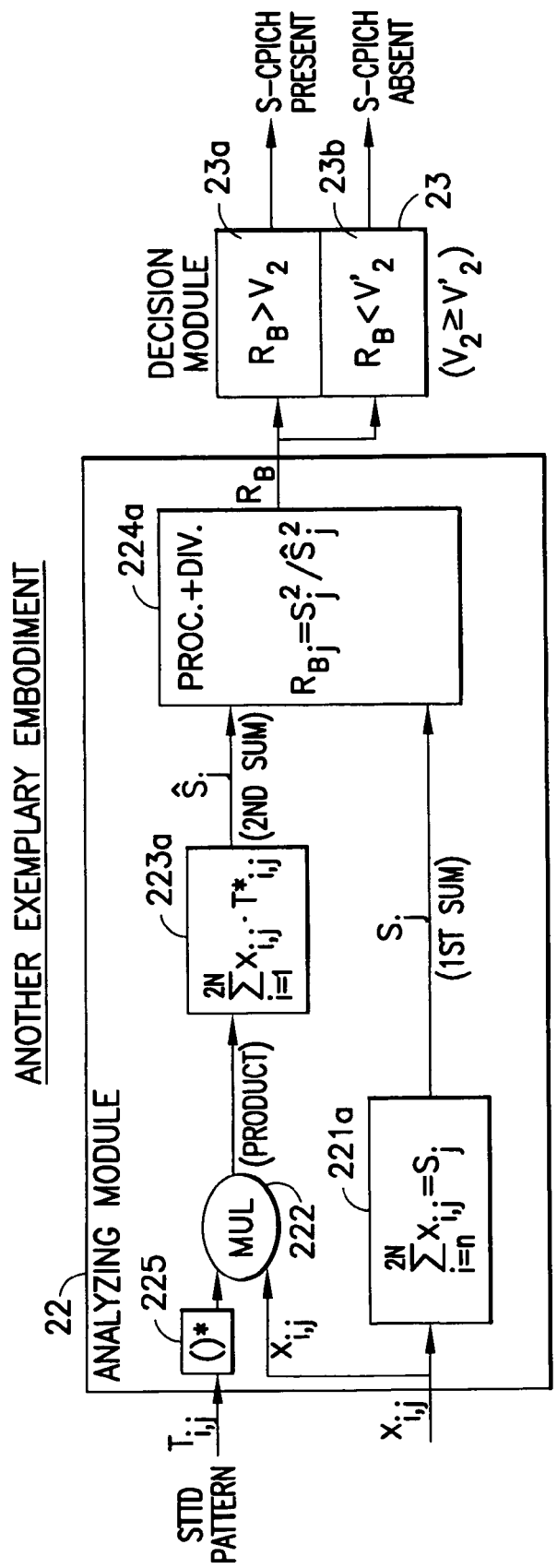
FIG. 5 is a block circuit diagram of details of an analyzing and decision module according to another exemplary embodiment.

The functional flow of the algorithm can be seen in FIG. 5. It requires the calculation of two sums: with and without applying the complex conjugate of the STTD pattern.

The functional flow of the algorithm can be seen in the figure above. It requires the calculation of two sums: with and without applying the complex conjugate of the STTD pattern:

A first summer unit 221a calculates a first sum as (for a cycle j)

$$Sj = \sum_{i=1}^{N} X_i$$

A second summer unit 223a calculates a second sum as (for a cycle j)

$$\hat{S}j = \sum_{i=1}^{N} X_i T_i^*$$

N must be dividable by 2 for this exemplary embodiment to work because that is the period of the STTD pattern. The actual value of N is system-dependent and can be tuned. The STTD pattern is specified as:

$T_i$=complex(1,1), $i$=even $T_i$=complex(-1,-1), $i$=odd

If $X_i$ consists of pilot symbols, the sum $\hat{S}j$ with the conjugated pilot symbol should be considerably smaller. Therefore if the ratio $R_{Bj}=S_j^2/\hat{S}_j^2$ is large enough, we can decide that the code contains the S-CPICH channel.

Like in the preceding exemplary embodiment, $R_B$ can be calculated per cycle j and are then buffered for subsequent evaluation.

Also here, some hysteresis should be added, a good solution found in practice was that if about 3-5 decisions are positive in a row then the symbols are regarded as S-CPICH.

Like in the first embodiment, when S-CPICH cancelling starts, the monitoring of the cancelled channel needs to continue. As stated before, the network can turn the control channel (S-CPICH) off if there are no MIMO users in the same cell. Therefore, cancelling a non-existent channel would actually cause interference. Exactly the same algorithm can be used, this time it is monitored if $R^B$ drops below a certain threshold for long enough. In this regard, this exemplary embodiment is similar or even identical to the one described before.

Figure 2:
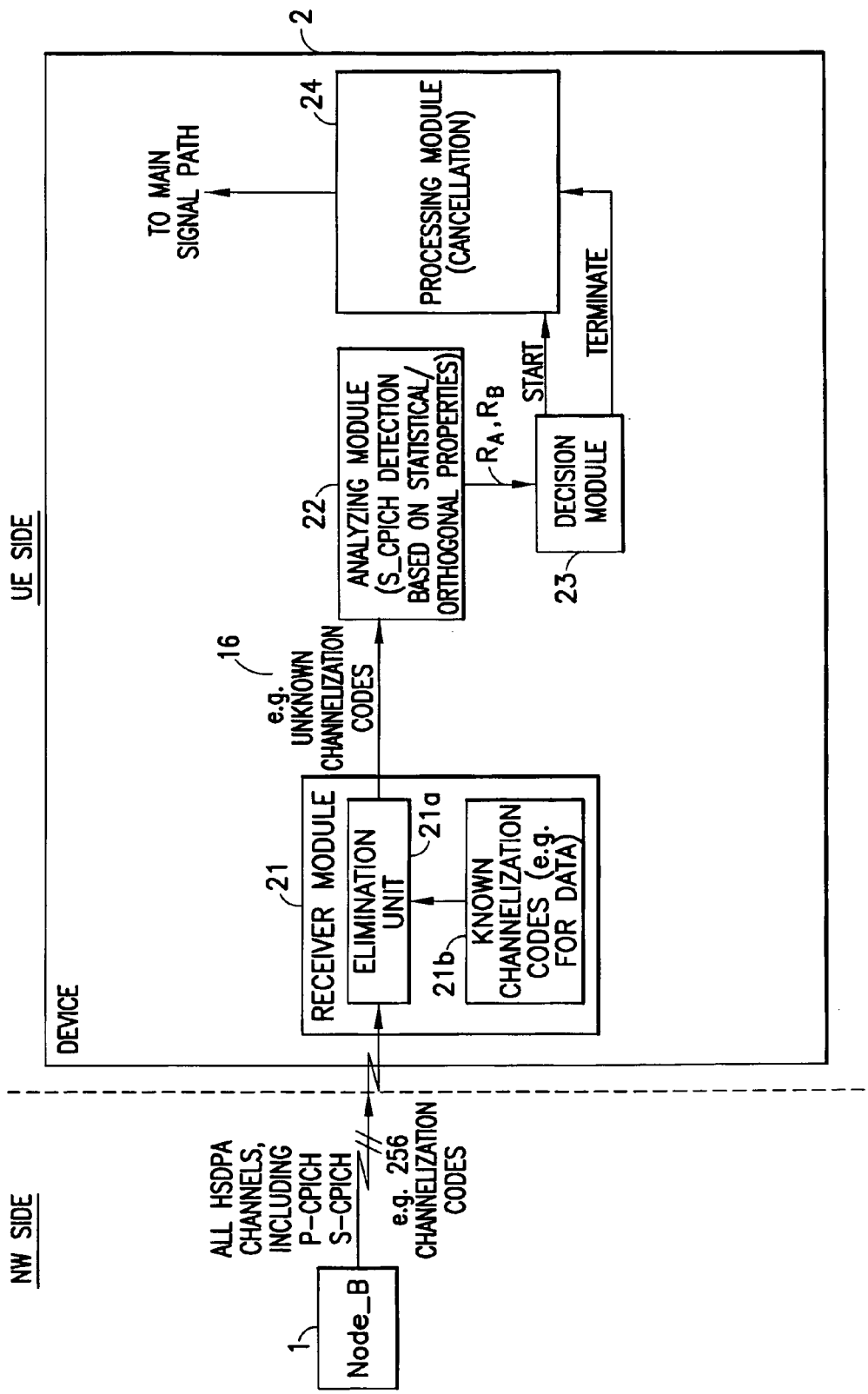
FIG. 2 is a basic block circuit diagram of at least a device of a receiver in relation to at least an exemplary embodiment.

FIG. 2 shows a basic block diagram of entities involved in connection with at least an exemplary embodiment of the invention. The network side is represented by a Node_B, denoted with 1, acting as a transmitter. The Node_B, 1, if operated in MIMO mode transmits all HSDPA channels including the control channels such as primary and secondary common pilot channels P-CPICH, S-CPICH. The pilot channels generally use for example 256 channelization codes. The pilot channels are received at the receiver side represented by a user equipment UE, denoted with 2, for example. The user equipment is illustrated in FIG. 2 only in parts. That is, only those parts relevant to understand the present invention are illustrated.

The user equipment, i.e. a device 2 forming part of the user equipment is equipped with a receiver module 21, an analyzing module 22, a decision module 23, and a processing module 24.

The receiver module 21 receives a sequence of channelization coded correlated symbols, e.g. as an output from a (not illustrated) preceding receiving stage including a correlator like for example a Rake receiver. The receiver module 21 receives the channelization encoded sequences for all channelization codes. The receiver module 21 is equipped with an elimination unit 21a which is adapted to eliminate sequences encoded with already known channelization codes. For example, as mentioned before, the common pilot channel or channels have a spreading factor of 256, which means that 256 different codes can be used. In order to reduce the processing load and/or processing time for the subsequent analysis, the number of codes of symbol sequences to be analyzed can be reduced significantly if all sequences based on known codes are removed. For example, in a HSDPA scenario, generally code numbers 16 to 255 out of a total of 256 are reserved for data transmission. It can thus be safely assumed that those codes do not carry a control and/or pilot channel such as the secondary common pilot channel S-CPICH. Therefore, reducing the 256 codes by code numbers 16 to 255 will result in a subset of sequences using only the first 16 codes (code no. #0 to #15) to be analyzed. Then, only those unknown codes which potentially carry the S-CPICH are supplied from the elimination unit 21a and/or the receiver module 21 to the analyzing module 22. The knowledge of known channelization codes that are used for example for data transmission is stored in a memory 21b of the receiver module. This memory can be configured upon manufacturing. Alternatively, this knowledge can be received according to another exemplary embodiment from the network side and supplied to the receiver module.

The analyzing module 22 analyzes a statistical or orthogonality property of the sequence or sequences received. If the analyzing module analyzes only one sequence of an individual channelization code per time, then the analyzing module subjects each sequence of channelization encoded correlated symbols one after the other to the analyzing. If the analyzing module is equipped with a plurality of hardware units, at least a partial parallel processing of the channelization encoded correlated symbol sequences can be performed.

For example, if the analyzing module contains 16 internal analyzing units, a full parallel processing could be possible. The result of the analyzing, i.e. an indicator of the statistical or orthogonality property of the sequence is supplied to the decision module 23. Note that details of the internal structure of the analyzing module 22 will be discussed herein after with reference to FIGS. 4 and 5, respectively.

The decision module 23 comprises a comparator configured to compare the (statistical/orthogonality) indicator with at least one threshold value. If the comparison reveals a first result, the specific control channel S-CPICH is decided to be present. If the comparison result reveals a second result, the specific control channel S-CPICH is decided to be absent. In case presence of the control channel is decided, the decision module issues a signal "start" supplied to the processing module 24 which is configured to perform a cancellation procedure for symbols of the control channel. Such cancellation processing reduces interference of the undesired secondary common pilot channel. By virtue of the cancellation processing, the processing module affects the main signal path (not shown in FIG. 2). The network is assumed to be configured correctly so as to turn off the S-CPICH channel whenever necessary (i.e. when there are no MIMO terminals in the network). Furthermore, if, on the other hand, the decision module 23 decides that the control channel is absent, the decision module may also output a signal "terminate" instructing the processing module to terminate an ongoing cancellation procedure.

Note that the decision module 23 can be configured to decide on presence and/or absence of the control channel simultaneously. However, the decision module can also be configured to decide on the presence only and can be reconfigured to decide on the absence of the control channel. The analyzing module does not need any changes in this regard. For example, reconfiguring of the decision module can be based on a request, e.g. once the S-CPICH was detected as present, such signal may switch the detection to monitor whether the S-CPICH is or was turned off by the network.

Figure 3:
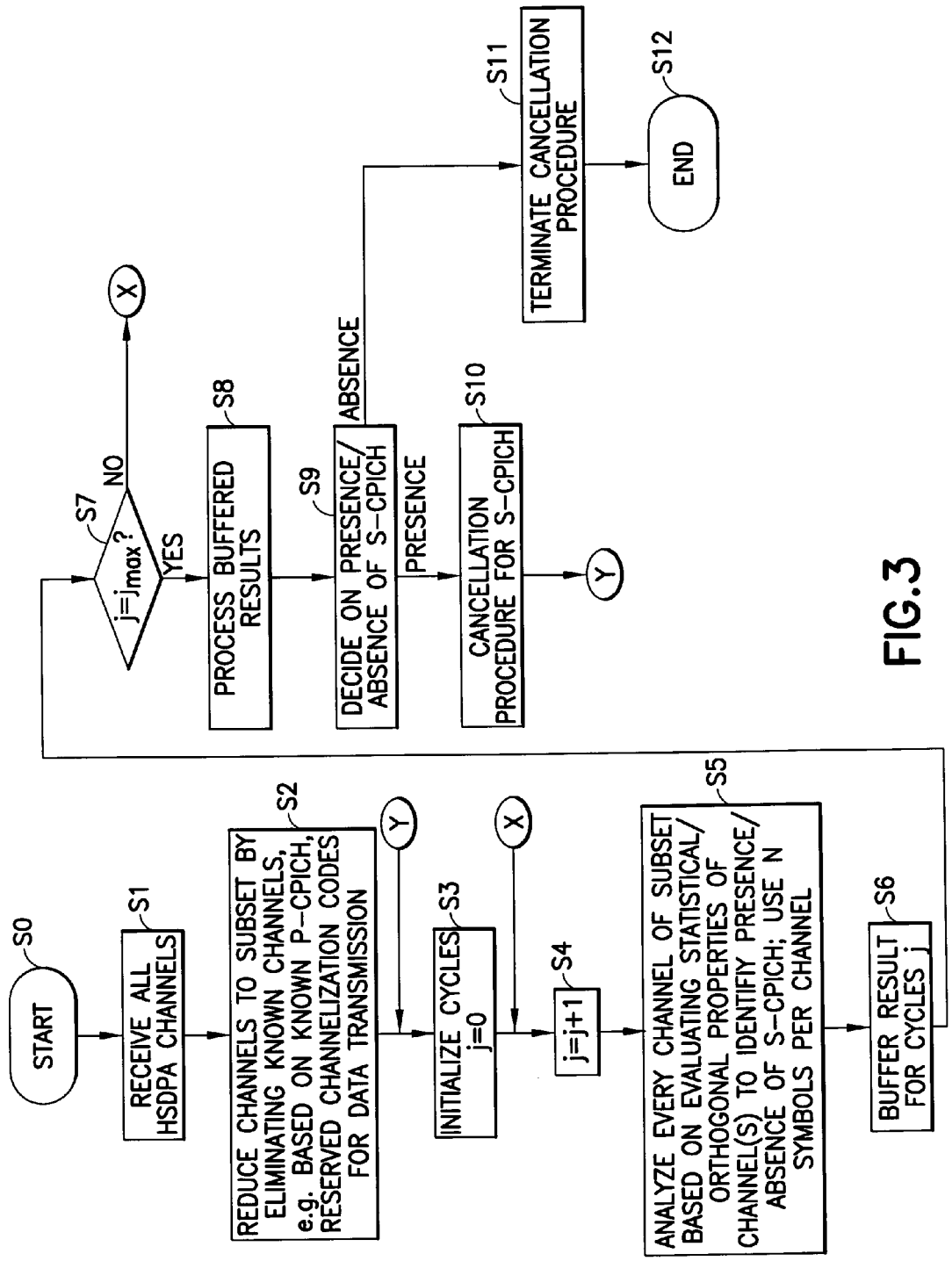
FIG. 3 is a flowchart of a method according to at least an exemplary embodiment.

FIG. 3 is a flow chart showing at least an exemplary embodiment of the method according to the invention. The process starts in step S0. In a step S1, the receiver receives all HSDPA channels, i.e. sequences of correlated symbols of all HSDPA channelization codes used (e.g. up to 256). In a following step S2, those channels are reduced to a subset of channels by eliminating known channels. This can be based for example on the fact that the channelization code for the primary common pilot channel P-CPICH is already known to all receivers, and also that certain channelization codes are reserved for data transmission, for example channelization codes 16 to 255 are reserved for data transmission. The subsequent analyzing of statistical properties is thus based only on a subset of for example 16 codes of respective channelization encoded correlated symbols.

The analyzing is performed in at least some exemplary embodiments for plural cycles j. Namely, performing analysis not only on a single symbol sequence will add some hysteresis and make the results more reliable. A good solution that was found in practice was that if about 3 to 5 decisions of analysis are positive in a row, then the analyzed symbols can be regarded as representing presence (or absence) of the S-CPICH. Therefore, 3 to 5 cycles are used for the analysis. In this regard, in a next step S3, the cycles are initialized by setting the variable j to zero. Thereafter, the variable j is increased by 1 in a step S4 for a first cycle. In a step S5, every coded channel of the subset is analyzed based on evaluating statistical/orthogonality properties of the channel or channels to identify the presence and/or absence of the S-CPICH. In order to carry out this analysis, a number of N symbols per channel is analyzed/evaluated. In at least an exemplary embodiment of the present invention, in connection with HSDPA, a good value for the number of symbols analyzed is the number of symbols transmitted in a transmit time interval TTI. According to HSDPA, 30 symbols are transmitted within one TTI. One TTI has a length of 2 ms according to HSDPA. Nevertheless, the number N of symbols can differ from 30. For example, the number of symbols can extend beyond one TTI for a cycle, or can be lower than the entire number of symbols transmitted in one TTI. However, in order to describe the present invention, it is assumed that one cycle corresponds to one TTI and that the number of symbols is not more than the number of symbols per TTI. After step S5, in a subsequent step S6, the respective result for the current cycle j is buffered. Thereafter, in a step S7, it is decided whether all cycles are carried out, i.e. it is decided whether j=jmax. As mentioned before, practical results have shown that jmax could be set to 3, 4, or 5 or even another value. If not, the flow returns from step S7 to step S4 where the variable j is incremented and the next cycle is started. If YES, the method advances to a step S8, where the number of j buffered results are processed. Subsequently, in a step S9, based on the processed buffered results it is decided (e.g. if all results, or a predetermined number of consecutive results, in the cycles were confirming the presence/absence of the S-CPICH) on the presence or absence of the S-CPICH in step S9.

If in step S9 the presence is decided, the flow advances to step S10, and the cancellation procedure for the S-CPICH is started. Thereafter, the flow returns to step S3, and the next analysis and decision processing is initialized. Namely, whether the network may have turned off the S-CPICH, could thereafter be useful to know in at least an exemplary embodiment, and hence the absence of the S-CPICH could be needed to be confirmed. This could be done by changing the decision criteria as outlined above. Namely, it could then be checked whether all, or a predetermined number of, or a predetermined consecutive number of processing results $R_A$ or $R_B$ is smaller than a respective threshold value. If, in such a scenario, step S9 results in a decision on the absence of the S-CPICH, the flow advances from step S9 to a step S11. In the step S11, the cancellation procedure is then stopped and/or terminated so as to avoid any interfering effect by carrying out a cancellation procedure for symbols of a channel that is actually not received any longer. Thereafter, the flow advances to a step S12 where the process in this exemplary embodiment ends. Nevertheless, in another scenario the flow could also return to step S0 and be resumed and/or the decision criteria could be switched again so as to monitor again the presence of the S-CPICH as a control channel (in case that S-CPICH is switched on again by the network at some point of time).

Figure 4:
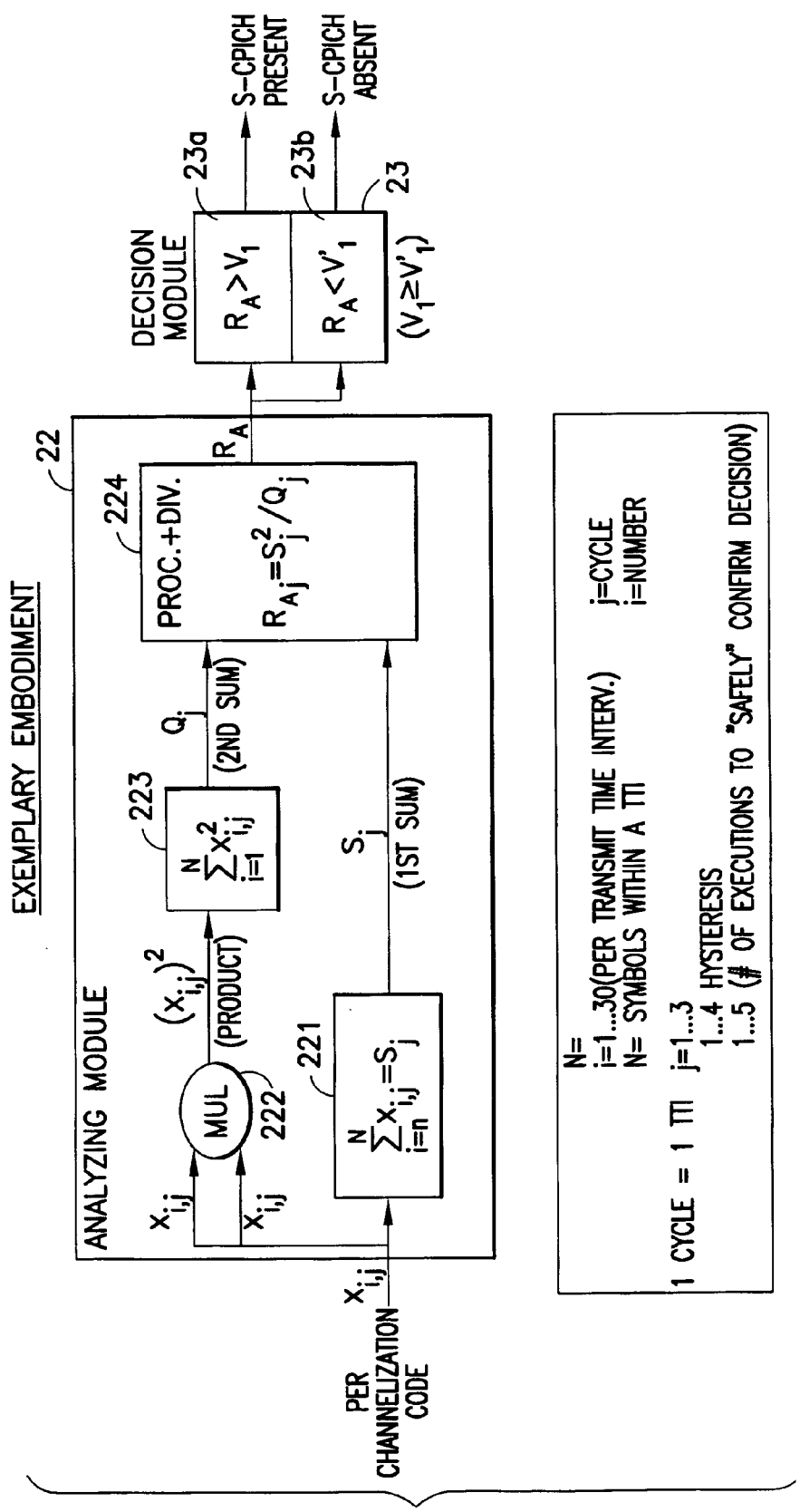
FIG. 4 is a block circuit diagram of details of an analyzing and decision module according to an exemplary embodiment.

FIG. 4 shows an exemplary embodiment of the analyzing module 22 and decision module 23 in greater detail.

The analyzing module 22 receives a sequence of channelization encoded correlated symbols $X_{ij}$ at its input. The variable i denotes the number of symbols subjected to analysis, for example up to N=30 as the number of symbols per transmit time interval TTI (of 2 ms duration according to HSDPA). The variable j denotes the number of cycles which are repeated for the analysis so as to improve reliability of the result and which variable thus provides for a kind of hysteresis. For example, practical numbers of cycles are for example 3, 4, or 5 or more. Thus, the variable j runs from 1 to 3, or from 1 to 4, or from 1 to 5, for example. The thus received symbols, for each cycle j, are supplied to a first summer unit 221 configured to sum-up a number N of the symbols $X_i$ to obtain a first sum $S_j$. Furthermore, the analyzing module comprises a multiplier unit 222 configured to multiply each of the number N of symbols $X_i$ with a respective multiplier to obtain a number N of respective products. In this exemplary embodiment, the respective multiplier is the respective symbol itself Thus, the product is the power of the symbols $(X_{i,j})^2$. Further, the analyzing module comprises a second summer unit 223 configured to sum-up a number N of the products to obtain a second sum $Q_j$. In a processing and division unit 224, the analyzing module is, in an exemplary embodiment, equipped with buffer units (not separately shown) configured to buffer, with and/or for each cycle, the power of the first sum and a divisor that is based on the second sum, respectively. The division unit is configured to divide the respective buffered power of the first sum by the respective buffered divisor to obtain a ratio $R_{Aj}$ per cycle j. In this exemplary embodiment, the divisor is the second sum. Thus, the result of division $R_A$ in this exemplary embodiment is expressed as $$R_{Aj}=S_j^2/Q_j$$

The value(s) $R_{Aj}$ thus obtained is/are then supplied to the decision module 23.

Note that in case a single cycle is executed only, the value $R_A$ is obtained as $S_j^2/Q_j$.

The decision module 23 according to this exemplary embodiment comprises comparator units 23a and 23b. Here, both comparator units are present. However, in a modification thereof, a single comparator unit can be sufficient and the comparator unit is switched in terms of the type of comparison that is performed (smaller or greater than) as well as switched in terms of the threshold value with which the comparison is performed, $V_1$, or $V_1'$. Such switching could be triggered by the preceding result. For example, as mentioned before, if the presence of the S-CPICH has been decided before (resulting from $R_A>V_1$), this signal could also be used to trigger a switching in the decision module so as to decide thereafter on the absence of an S-CPICH based on comparing whether $R_A<V_1'$. Such signal, in turn, could be used to switch back again to decide on the presence, and so forth. However, in order to avoid a too complex description of this aspect, both comparator units are, for purposes of this exemplary embodiment, described to be present simultaneously. Namely, the values $R_{Aj}$ obtained as a result of the processing and division unit 224 is/are supplied to both comparator units, 23a and 23b. The comparator unit or units are configured to compare the ratio with at least one threshold value and configured to output a signal indicating presence of the control channel if the ratio is larger than a first threshold value ($V_1$) and configured to output a signal indicating absence of the control channel S-CPICH if the ratio is smaller than a second threshold value ($V_1'$). It is beneficial if the first threshold value is greater than or equal to the second threshold value. Thus, as illustrated in FIG. 4, the comparator unit 23a outputs a signal indicating presence of S-CPICH if $R_A>V_1$, while the comparator unit 23b outputs a signal indicating absence of the S-CPICH if $R_A<V_1'$. Also, in a modification, instead of buffering $R_{Aj}$ in the module 22 or the unit 224 thereof, buffers could also be provided in/associated to the decision module 23.

Basically, as mentioned before, the evaluation of plural cycles (e.g. j=3) resides in deciding:

IF $((RA1>V1)$ AND $(RA2>V1)$ AND $(RA3>V1))$

THEN
(S-CPICH is present).
Alternatively, it is not excluded to use an evaluation like

IF $((RA1+RA2+RA3)>3*V1)$

THEN
(S-CPICH is present).

Also, other modifications of the above are not excluded. Likewise such evaluation can be used in deciding in connection with the another exemplary embodiment shown in and explained with reference to FIG. 5 below.

FIG. 5 shows another exemplary embodiment of the analyzing module 22 and decision module 23. Similar units constituting those modules are denoted with the same reference numbers. Also, a repeated description thereof is omitted and merely the differences between the exemplary embodiments illustrated in FIGS. 4 and 5, respectively are highlighted. In this embodiment, rather than evaluating a statistical property of the sequence, an orthogonality property is analyzed and exploited for deciding on presence/absence of the control channel such as the S-CPICH pilot channel.

As mentioned with regard to FIG. 4, the respective multiplier is the respective symbol itself while the divisor is the second sum and the number N of symbols is an arbitrary number of symbols, i.e. even or uneven.

However, in the exemplary embodiment illustrated in FIG. 5, the number N of symbols is an even number, the respective multiplier is the complex conjugate of an STTD pattern, and the divisor is the power $(\hat{S}_j)^2$ of the second sum The STTD pattern is supplied to a module 225 outputting a conjugate complex of the input pattern, and the conjugate complex output of the STTD pattern is supplied to the multiplier unit 222.

Therefore, the variable i used for summing in the summer units 221a and 223a is indicated to range from i=1 to 2N so as to exemplify that the number of symbols subjected to analysis is an even number. Hence, 2N may correspond to 30 as the number of symbols per TTI. In other respects, this analyzing and decision module is similar to the one illustrated and explained with reference to FIG. 4.

Due to a different processing, the output of the processing and division unit 224a is labeled $R_B$, and the threshold value used to be compared with the result $R_B$ is denoted as $V_2$ and $V_2'$ respectively. However, the absolute value of $V_1$ and $V_2$ can be equal, and also $V_1'$ and $V_2'$ can be equal.

In FIG. 5, the first threshold value is represented by $V_2$ so that if $R_B>V_2$, the decision module indicates presence of the S-CPICH. Moreover, the second threshold value is denoted as $V_2'$ so that if $R_B<V_2'$ is fulfilled, then the decision module indicates absence of S-CPICH. Also in this exemplary embodiment, the first threshold value $V_2$ is greater than or equal to the second threshold value $V_2'$.

Embodiments of the present invention may be implemented in software, hardware, application logic or a combination of software, hardware and application logic. The software, application logic and/or hardware generally resides on the receiver side.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

The present invention relates in particular but without limitation to mobile communications, for example to HADPA environments under WCDMA, LTE, WIMAX and WLAN and can advantageously be implemented in user equipments or smart phones, or personal computers connectable to such networks. That is, it can be implemented as/in chipsets to connected devices, and/or modems thereof. More generally, all products which contain a modem will see performance improvement in MIMO networks (as long as they are not in MIMO mode themselves) with the invention being implemented thereto.

Since the problem has not existed before, the invention represents a first solution thereto. Reliable experiments of the inventor have shown an improvement of up to 1-2 dB under practical conditions. The method and correspondingly configured devices can detect a used S-CPICH channel reliably in less than 10 ms, and since in practice the channel will be on at least for minutes or hours, it is very efficient. The method/device has practically no chance of false detections, if tuned correctly.

Both exemplary embodiments according to FIGS. 4 and 5 show identical performance in all practical cases. At least an exemplary embodiment based on the "statistical property" also proved to be most effective in very challenging conditions (high noise, very weak S-CPICH, quickly changing channel). The complexity of the two methods is also almost identical. The only differences are that the STTD pattern based method requires the generation of the STTD pattern and instead of a multiplication between complex symbols, this method has multiplication between complex symbols and +1.

In some systems, multiplying only with ±1 instead of a complex symbol could be less complex, but in the ASIP (application specific instruction set processor) processor that is used for S-CPICH detection in wireless modems, the operations have identical complexity. The methods described in this document could very well be used in a processor that handles complex symbols less efficiently, since the practical performance of both methods is just as good.

A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The present invention proposes a method, comprising receiving a sequence of channelization encoded correlated symbols $x_i$, analyzing statistical or orthogonality properties or the sequence, and deciding on presence or absence of a specific control channel based on the analyzed properties. The present invention also proposes a correspondingly configured device and computer program product. By virtue thereof, "blind" detection of the specific control channel such as a S-CPICH is possible.

What is claimed is:

1. A method, comprising:
receiving a sequence of channelization encoded correlated symbols,
analyzing properties of the received sequence to detect a presence or absence of a specific control channel, wherein said analyzing is performed without use of a specific channelization code for the specific control channel, wherein the analyzing comprises:
summing up a plurality of symbols to obtain a first sum,
multiplying each one of the plurality of symbols with a respective multiplier to obtain a plurality of respective products,
summing up the plurality of respective products to obtain a second sum, and
dividing a square of the first sum by a divisor to obtain a ratio, wherein the divisor comprises the second sum or a square of the second sum,
and deciding on the presence or absence of the specific control channel based on the analyzed properties, wherein the deciding comprises comparing the ratio with at least one threshold value, wherein,
in response to the ratio being larger than a first threshold value, the specific control channel is decided to be present, and
in response to the ratio being smaller than a second threshold value, the specific control channel is decided to be absent.

2. The method according to claim 1, wherein the received sequence of channelization encoded correlated symbols comprises a plurality of channelization encoded correlated symbols for a plurality of channelization codes, wherein the plurality of channelization codes are within a set of all channelization codes, wherein the receiving comprises:
eliminating, from the received sequence of channelization encoded correlated symbols, those symbols that are encoded with known channelization codes, and
subjecting remaining ones of the received sequence of channelization encoded correlated symbols that are encoded with unknown channelization codes to the analyzing.

3. The method according to claim 1, further comprising:
in response to deciding on the presence of the specific control channel, performing a cancellation procedure for symbols of the specific control channel.

4. The method according to claim 1, wherein the properties reside in a statistical or orthogonality property of the received sequence.

5. The method according to claim 1, further comprising
in response to deciding on the absence of the specific control channel, terminating a cancellation procedure for symbols of the specific control channel.

6. The method according to claim 1, wherein the analyzing is performed for a plurality of cycles.

7. The method according to claim 6, wherein one cycle of the plurality of cycles corresponds to a transmit time interval of the received sequence, and the plurality of symbols is not more than a number of symbols per transmit time interval.

8. The method according to claim 1, wherein the respective multiplier is the respective symbol itself, and the divisor is the second sum.

9. The method according to claim 1, wherein the plurality of symbols is an even number of symbols, the respective multiplier is a complex conjugate of a space time transmit diversity pattern, and the divisor is the square of the second sum.

10. The method according to claim 1, wherein the first threshold value is greater than or equal to the second threshold value.

11. A device, comprising:
a receiver module configured to receive a sequence of channelization encoded correlated symbols,
an analyzing module configured to analyze properties of the received sequence to detect a presence or absence of a specific control channel, wherein said analysis is performed by the analyzing module without use of a specific channelization code for the specific control channel, wherein the analyzing module comprises:
a first summer unit configured to sum up a plurality of symbols to obtain a first sum,
a multiplier unit configured to multiply each one of the plurality of symbols with a respective multiplier to obtain a plurality of respective products,
a second summer unit configured to sum up the plurality of respective products to obtain a second sum, and
a division unit configured to divide a square of the first sum by a divisor to obtain a ratio, wherein the divisor comprises the second sum or a square of the second sum,
and a decision module configured to decide on the presence or absence of the specific control channel based on the analyzed properties, wherein the decision module comprises a comparator unit configured to: compare the ratio with at least one threshold value and to:
output a signal indicating presence of the specific control channel responsive to the ratio being larger than a first threshold value, and
output a signal indicating absence of the specific control channel responsive to the ratio being smaller than a second threshold value.

12. The device according to claim 11, wherein the received sequence of channelization encoded correlated symbols comprises a plurality of channelization encoded correlated symbols for a plurality of channelization codes, wherein the plurality of channelization codes are within a set of all channelization codes, wherein the receiver module is configured:
to eliminate, from the received sequence of channelization encoded correlated symbols, those symbols that are encoded with known channelization codes, and
to input remaining ones of the received sequence of channelization encoded correlated symbols that are encoded with unknown channelization codes to the analyzing module.

13. The device according to claim 11, further comprising a processing module configured to perform a cancellation procedure for symbols of the specific control channel responsive to an output of the decision module indicating presence of the specific control channel.

14. The device according to claim 11, wherein the properties reside in a statistical or orthogonality property of the received sequence.

15. The device according to claim 11, wherein the decision module is further configured to issue a request to terminate a cancellation procedure for symbols of the specific control channel responsive to an output of the decision module indicating absence of the specific control channel.

16. The device according to claim 11, wherein the analyzing module is configured to perform an analysis for a plurality of cycles.

17. The device according to claim 16, wherein one cycle of the plurality of cycles corresponds to a transmit time interval of the received sequence, and the plurality of symbols is not more than a number of symbols per transmit time interval.

18. The device according to claim 11, wherein the respective multiplier is the respective symbol itself, and the divisor is the second sum.

19. The device according to claim 11, wherein the plurality of symbols is an even number of symbols, the respective multiplier is a complex conjugate of a space time transmit diversity pattern, and the divisor is the square of the second sum.

20. The device according to claim 11, wherein the first threshold value is greater than or equal to the second threshold value.

21. A non-transitory computer-readable storage medium tangibly storing computer executable code portions, which, when executed on a processor, are configured to:
receive a sequence of channelization encoded correlated symbols,
analyze properties of the received sequence to detect a presence or absence of a specific control channel, wherein said analysis is performed without use of a specific channelization code for the specific control channel, and wherein the analysis comprises:
summing up a plurality of symbols to obtain a first sum,
multiplying each one of the plurality of symbols with a respective multiplier to obtain a plurality of respective products,
summing up the plurality of respective products to obtain a second sum, and
dividing a square of the first sum by a divisor to obtain a ratio, wherein the divisor comprises the second sum or a square of the second sum, and
decide on the presence or absence of the specific control channel based on the analyzed properties, wherein the deciding comprises comparing the ratio with at least one threshold value, wherein,
in response to the ratio being larger than a first threshold value, the specific control channel is decided to be present, and
in response to the ratio being smaller than a second threshold value, the specific control channel is decided to be absent.

22. The method according to claim 6, wherein the analyzing further comprises:
buffering at least one value from at least one previous cycle for use in the dividing step of a current cycle.

23. The method according to claim 1, wherein the specific control channel comprises a secondary common pilot channel of a high speed downlink packet access network that supports multiple input multiple output communication.

* * * * *